United States Patent
Nakatsu et al.

(10) Patent No.: US 6,929,689 B2
(45) Date of Patent: *Aug. 16, 2005

(54) INK FOR INKJET RECORDING

(75) Inventors: Hiromi Nakatsu, Amagasaki (JP); Masanori Kinomoto, Yamatokoriyama (JP); Kiyofumi Morimoto, Tenri (JP); Takanori Kamoto, Nara (JP); Ichiro Fujii, Gose (JP); Hiroaki Nakaya, Osakasayama (JP)

(73) Assignee: Sharp Kabushiki Kaisha, Osaka (JP)

( * ) Notice: Subject to any disclaimer, the term of this patent is extended or adjusted under 35 U.S.C. 154(b) by 171 days.

This patent is subject to a terminal disclaimer.

(21) Appl. No.: 10/423,965

(22) Filed: Apr. 28, 2003

(65) Prior Publication Data

US 2003/0200897 A1 Oct. 30, 2003

(30) Foreign Application Priority Data

Apr. 30, 2002 (JP) ........................................ 2002-128805
Apr. 30, 2002 (JP) ........................................ 2002-128811

(51) Int. Cl.⁷ .......................... C09D 11/00; C09D 11/02
(52) U.S. Cl. ................................ 106/31.58; 106/31.86
(58) Field of Search .................... 106/31.59, 31.86, 106/31.58

(56) References Cited

U.S. PATENT DOCUMENTS

| | | | |
|---|---|---|---|
| 5,320,897 A | 6/1994 | Kondo | 428/32.36 |
| 5,868,822 A * | 2/1999 | Yui et al. | 106/31.26 |
| 5,938,829 A * | 8/1999 | Higashiyama et al. | 106/31.58 |
| 5,985,015 A * | 11/1999 | Kanaya | 106/31.6 |
| 5,988,807 A * | 11/1999 | Bernard et al. | 347/100 |
| 6,207,329 B1 * | 3/2001 | Shirota et al. | 430/7 |
| 6,572,227 B2 * | 6/2003 | Yamashita et al. | 347/100 |
| 6,811,251 B2 * | 11/2004 | Kinomoto et al. | 347/101 |
| 2003/0151643 A1 * | 8/2003 | Doi | 347/43 |
| 2004/0257420 A1 * | 12/2004 | Ichizawa et al. | 347/100 |

FOREIGN PATENT DOCUMENTS

| | | |
|---|---|---|
| JP | 55-42858 A | 3/1980 |
| JP | 55-80477 A | 6/1980 |
| JP | 62-30169 A | 2/1987 |
| JP | 4-170478 A | 6/1992 |
| JP | 4-259566 A | 9/1992 |
| JP | 6-92008 A | 4/1994 |
| JP | 6-136307 A | 5/1994 |
| JP | 6-136308 A | 5/1994 |
| JP | 6171072 | 6/1994 |
| JP | 10-330666 A | 12/1998 |
| JP | 2000-144028 A | 5/2000 |

OTHER PUBLICATIONS

Examiner Tran comments of relevance of JP 6171072 in U.S. Appl. No. 10/428,766 (Feb. 3, 2004).

* cited by examiner

Primary Examiner—Helene Klemanski
(74) Attorney, Agent, or Firm—Nixon & Vanderhye P.C.

(57) ABSTRACT

The present invention provides ink for inkjet recording containing ethylene glycol base ether and/or monovalent alkyl alcohol, a surfactant and a coloring agent, the ink showing the following characteristics when 2 μl of the ink is dropped on a piece of ordinary paper having smoothness of 100 sec or lower:

a) an initial contact angle is in the range of 30 to 80°;

b) a dynamic contact angle after 1 second $X=\theta-\theta_o$ ($\theta$ is a dynamic contact angle after 1 second) according to dynamic absorption measurement is in the range of $-70 \leq X \leq -20$ (°/s); and c) the rate of change of a dot area after t second (0.1<t<5 (s)) $Y=r_t^2/r_o^2$ ($r_t$ is a dot radius after t second) is in the range of 1.5<Y. With this ink, clear images which are less prone to smear are produced even by high speed recording on a piece of ordinary paper.

6 Claims, No Drawings

INK FOR INKJET RECORDING

CROSS-REFERENCE TO RELATED APPLICATION

This application is related to Japanese Patent Applications No.2002-128805 and No. 2002-128811 filed on 30 Apr. 2002, whose priorities are claimed under 35 USC §119, the disclosures of which are incorporated by reference in its entirety.

BACKGROUND OF THE INVENTION

1. Field of the Invention

The present invention relates to an ink for inkjet recording. More specifically, it relates to an ink for inkjet recording which is less prone to bleed and spread on ordinary paper even by high speed recording and capable of realizing clear images.

2. Description of Related Art

With the progress of techniques for manufacturing a head provided with nozzles of high integration and high definition in recent inkjet recording technology, it is becoming possible to discharge finer ink droplets to print images having high resolution of 1200 dpi or more at high speed. In particular, high quality images can be recorded at high resolution on a medium exclusive to inkjet printing provided with an ink receptor layer on its surface.

However, even by the recent inkjet recording technology, images recorded on ordinary paper are still prone to be poor in recording quality. Spreading and bleeding (mixing of colors) of the ink at the boundary of ink dots adjacent to each other on the ordinary paper are pronounced and problematic, which have not been solved yet.

Japanese Unexamined Patent Publication No. HEI 4 (1992)-259566 proposes a technique of preventing the ink from spreading and bleeding. According to this technique, scanning is performed several times to discharge ink droplets from all discharge outlets in such a manner that ink dots adjacent to each other are recorded on a recording material at an increased time interval. However, this recording technique is problematic in that the recording speed becomes very low and the spreading and bleeding of the ink cannot be avoided depending on the combination of the ink and the recording material.

Japanese Unexamined Patent Publication No. HEI 6(1994)-92008 proposes ink containing at least acetylene glycol and showing a contact angle of 40' or smaller 5 seconds after dropping onto sized paper. However, the contact angle obtained 5 seconds after dropping is meaningless in view of phenomena shown by the ink droplets in the actual inkjet recording, and therefore it seems irrelevant to the prevention of the spreading and bleeding of the ink.

Japanese Unexamined Patent Publications Nos. HEI 6(1994)-136307 and HEI 6(1994)-136308 propose to apply ink whose advancing tension and an advancing contact angle are numerically controlled to the inkjet recording. However, it is not sure how the advancing tension and the advancing contact angle of the ink are related to the permeation speed of the ink and the smearing of the images. There is uncertainty as to whether or not this ink is capable of realizing high quality images by high speed printing.

Japanese Unexamined Patent Publication No. HEI 10(1998)-330666 proposes ink showing wet time of 0.2 sec or less according to Bristow method and the advancing contact angle of 40 to 70° with respect to a recording material of 10 sec or more. The wet time according to Bristow method is a value for indicating roughness of the paper, which interprets the ink permeation from a macroscopic viewpoint. Therefore, it is quite different from the permeation of the superfine ink droplets in the field of the current inkjet recording and thus irrelevant to the spreading of the ink and the high speed printing.

Japanese Unexamined Patent Publication No. 2000-144028 discloses pigment ink wherein the rate of change of a dynamic contact angle over time on ordinary paper is 0.5 to 3.5°/s. However, this ink permeates very slowly, which inevitably causes the bleeding.

Japanese Unexamined Patent Publication No. SHO 62 (1987)-30169 discloses ink containing lower alkylene glycol monoacrylether as means of improving the fixing property of the ink. Further, Japanese Unexamined Patent Publication No. SHO 55 (1980)-80477 discloses a technique of preventing the ink from spreading on a paper surface in a lateral direction by using carboxymethyl cellulose. These techniques do not create big problems in fixing property and printing quality. However, both of the techniques are intended to enhance affinity between ink and paper to improve permeability, thereby preventing uneven permeation. Therefore, the ink permeates not only on the paper surface but also deeply in a depth direction of the paper. This is disadvantageous because the image density decreases.

On the other hand, Japanese Unexamined Patent Publication No. SHO 55 (1980)-42858 discloses a technique of using a surfactant having specific surface tension to decrease the spreading and blurring of the ink which may be caused upon overlaying other colors thereon. However, the ink containing the surfactant permeates deep into the paper after printing, which also decreases the image density.

Japanese Unexamined Patent Publication No. HEI 4 (1992)-170478 proposes ink whose initial contact angle and surface tension are large to prevent uneven permeation of the ink on the ordinary paper. However, in order to enhance the image density using this ink, the ink needs to be used in a large amount. This deteriorates the fixing property and the anti-bleeding property of the ink.

SUMMARY OF THE INVENTION

The inventors of the present invention have carried out intensive research to solve the above-described problems and found that clear images which are less prone to mix colors and smear are produced even by high speed recording on a piece of ordinary paper by using ink for inkjet recording containing ethylene glycol base ether and/or monovalent alkyl alcohol, a surfactant and a coloring agent, the ink showing the following characteristics when 2 μl of the ink is dropped on a piece of ordinary paper having smoothness of 100 sec or lower:

a) an initial contact angle is in the range of 30 to 80°;

b) a dynamic contact angle after 1 second $X=\theta-\theta_o$ ($\theta$ is a dynamic contact angle after 1 second) according to dynamic absorption measurement is in the range of $-70 \leq X \leq -20$ (°/s); and c) the rate of change of a dot area after t second ($0.1 < t < 5$ (s)) $Y = r_t^2/r_o^2$ ($r_t$ is a dot radius after t second) is in the range of $1.5 < Y$. Thus, the first invention has been achieved.

The ink of the first invention preferably shows the following characteristics that a) the initial contact angle is in the range of 50 to 80°, b) the dynamic contact angle is in the range of $-50 \leq X \leq -20$ (°/s) and c) the rate of change of the dot area is in the range of 1.5 to 3.0; the content of ethylene glycol base ether is 0.5% or more or the content of monovalent alkyl alcohol is 1% or more; the surfactant is a nonionic surfactant; the content of the surfactant is 0.001 to 0.5%; and a binder resin is further contained.

As the second invention, there is provided ink for inkjet recording containing at least an organic solvent, a surfactant and a coloring agent and showing the following characteristics when 2 μl of the ink is dropped on a piece of ordinary paper having smoothness of 100 sec or lower:

a) an initial contact angle is in the range of 30 to 80°;

b) a dynamic contact angle after 1 second $X=\theta-\theta_o$ ($\theta$ is a dynamic contact angle after 1 second) according to dynamic absorption measurement is in the range of $-10 \leq X \leq 0$ (°); and c) the rate of change of a dot area after t second (0<t<10 (s)) $r_t^2/r_o^2$ ($r_t$ is a dot radius after t second) is in the range of $1 \leq r_t^2/r_o^2 \leq 1.5$.

The ink of the second invention preferably shows the following characteristics that a) the initial contact angle is in the range of 60 to 80° and b) the dynamic contact angle X is in the range of $-10 \leq X \leq -1$ (°); at least one polyalcohol and/or polyalcohol ether is contained as the organic solvent; the content of the organic solvent is less than 30% of the total weight of the ink; the surfactant is a nonionic surfactant; and a binder resin is further contained.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The ink of the first invention has the following characteristics when 2 μl of the ink is dropped on a piece of ordinary paper having smoothness of 100 sec or lower.

a) an initial contact angle is in the range of 30 to 80°, preferably 50 to 80°, b) a dynamic contact angle X is in the range of $-70 \leq X \leq -20$ (°/s), preferably $-50 \leq X \leq -20$ (°/s); and c) the rate of change of a dot area Y is in the range of 1.5<Y, preferably 1.5 to 3.0.

For the measurement, 2 μl of an ink droplet is dropped on a piece of ordinary paper using a DAT apparatus manufactured by Fibro at 25° C. and 60%. The dynamic contact angle X is determined by the formula of $X=\theta_o-\theta$ wherein $\theta_o$ is an initial contact angle measured immediately after the ink droplet contacts the recording material and θ is a contact angle measured 1 second after the contact of the ink droplet.

The rate of change of a dot area Y is determined by the formula of $Y=r_t^2/r_o^2$ wherein $r_o$ is an initial dot radius and $r_t$ is a dot radius after t second.

The dynamic contact angle of the ink and the spreading of the ink droplet after the contact can be controlled depending upon the kind of a solvent and a surfactant contained in the ink.

The ink of the first invention contains, as a solvent, ethylene glycol base ether and/or monovalent alkyl alcohol as described above. In view of improving the permeability of the ink, it is preferred that the content of ethylene glycol base ether is 0.5% or more of the total weight of the ink and/or the content of monovalent alkyl alcohol is 1% or more. For improvement in image density, triethylene glycol base ether or tetraethylene glycol base ether is preferably used as the ethylene glycol base ether.

The surfactant is preferably a nonionic surfactant in view of stability in a liquid state and of surface tension. To give a sufficient effect such as high image quality, it is more preferred that the content of the surfactant is 0.001 to 0.5% of the total weight of the ink. More specifically, an acetylene base surfactant, such as SOFTANOL (registered trademark) and SURFYNOL (registered trademark), is used as the nonionic surfactant to improve the discharge performance.

The coloring agent usable for the ink of the first invention may be any one of dyes and pigments. The content thereof is 0.5 to 20% of the total weight of the ink, which achieves sufficient image density and fixes the images favorably.

Examples of the water-soluble dyes include acid dyes, food dyes, direct dyes, basic dyes and reactive dyes. The pigments may be organic or inorganic pigments. These may be used solely or in combination as required. More specific examples thereof are shown below.

Examples of the acid dyes and food dyes include: C.I. acid yellow 17, 23, 42, 44, 79 and 142; C.I. acid red 1, 8, 13, 14, 18, 26, 27, 35, 37, 42, 52, 82, 87, 89, 92, 97, 106, 111, 114, 115, 134, 186, 249, 254 and 289; C.I. acid blue 9, 29, 45, 92 and 249; C.I. food yellow 3 and 4; and C.I. food red 7, 9 and 14. Examples of the direct dyes include: C.I. direct yellow 11, 12, 24, 26, 33, 44, 50, 86, 120, 132, 142 and 144; C.I. direct red 1, 4, 9, 13, 17, 20, 28, 31, 39, 80, 81, 83, 89, 225 and 227; C.I. direct orange 26, 29, 62 and 102; and C.I. direct blue 1, 2, 6, 15, 22, 25, 71, 76, 79, 86, 87, 90, 98, 163, 165, 199 and 202. Examples of the basic dyes include: C.I. basic yellow 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91; C.I. basic red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112; and C.I. basic blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155. Examples of the reactive dyes include: C.I. reactive yellow 1, 5, 11, 13, 14, 20, 21, 22, 25, 40, 47, 51, 55, 65 and 67; C.I. reactive red 1, 14, 17, 25, 26, 32, 37, 44, 46, 55, 60, 66, 74, 79, 96 and 97; and C.I. reactive blue 1, 2, 7, 14, 15, 23, 32, 35, 38, 41, 63, 80 and 95. Among the above dyes, it is preferable to use the direct bleu 199.

Examples of the organic pigments include azo pigments, phthalocyanine pigments, anthraquinone pigments, quinacrine pigments, dioxazine pigments, indigo pigments, thioindigo pigments, perylene pigments, isoindolinone pigments, aniline black, azomethine pigments, rhodamine B lake pigments and carbon black. Examples of the inorganic pigments include iron oxide, titanium oxide, calcium carbonate, barium sulfate, aluminum hydroxide, barium yellow, Berlin blue, cadmium red, chrome yellow and metallic powder.

In view of improving water resistance and light resistance of the pigment, the organic pigment, for example, is preferably converted to a self-dispersion pigment by surface reforming treatment such as acid-basic treatment, coupling, treatment, polymer graft treatment, plasma treatment and oxidation/reduction treatment. Specifically, phthalocyanine or carbon black of self-dispersion type is more preferably used.

The ink of the first invention is obtained by adding water, e.g., ion exchange water, to the above-described ingredients to reach a desired amount. The ink shows static surface tension of 25 to 50 dyne/m and viscosity of 1 to 10 cp, which allow inkjet recording, in particular discharge from a piezo type head.

By using the ink of the first invention, an ink droplet that contacts the recording material permeates completely into the recording material before the following ink droplet is dropped in the vicinity or in an overlapping position of the former droplet. Therefore, the ink is prevented from bleeding and images are formed without the spreading of the ink in the lateral direction caused by too fast permeation. Thus, clear images less prone to cause the bleeding or spreading are obtained even by high speed recording on ordinary paper.

As a result, without using expensive special-purpose paper, high quality printing is realized on inexpensive ordinary paper in a short time, which decreases running costs.

The ink of the first invention may contain, in addition to the above-described ingredients, a binder resin, a water-soluble organic solvent and various additives known in the art.

Specifically, a polyester resin is used as the binder resin. This allows improvement in fixing property, water resistance, as well as discharge property.

Examples of the water-soluble organic solvent to prevent dying and improve stability of the ink include: polyalcohols such as ethylene glycol, diethylene glycol, triethylene glycol, polyethylene glycol, polypropylene glycol, 1,5-pentanediol, 1,6-hexanediol, glycerin, 1,2,6-hexanetriol, 1,2,4-butanetriol and 1,2,3-butanetriol; nitrogen-containing, heterocyclic compounds such as N-methyl-2-pyrrolidone, N-hydroxyethyl-2-pyrrolidone, 2-pyrrolidone, 1,3-dimethyl imidazolidinone and ε-caprolactam; amides such as formamide, N-methylformamide and N,N-dimethylformamide; amines such as monoethanolamine, diethanolamine, triethanolamine, monoethylamine, diethylamine and triethylamine; sulfur-containing compounds such as dimethyl sulfoxide, sulforane, thiodiethanol, ethylene urea and urea; propylene carbonate; ethylene carbonate; and γ-butyrolactone. These may be used solely or in combination.

Further, as an antiseptic fungicide, for example, sodium dehydroacetate, sodium sorbate, sodium 2-pyridinethiol-1-oxide, sodium benzoate and sodium pentachlorophenol may be used. As a pH adjuster, any substance may be used freely as long as it can adjust the pH to 7 or higher without adversely affecting the ink to be prepared. Examples thereof include amines such as diethanolamine and triethanolamine, hydroxides of alkaline metal elements such as lithium hydroxide, sodium hydroxide and pottasium hydroxide, ammonium hydroxide, quaternary ammonium hydroxide, quaternary phosphonium hydroxide and carbonates of alkaline metals such as lithium carbonate, sodium carbonate and pottasium carbonate. As a chelating reagent, for example, usable are ethylene-diamine-tetraacetic acid sodium, nitrilotriacetic acid sodium, hydroxyethyl ethylene-diamine-triacetic acid sodium, diethylene-triamine-pentaacetic acid sodium and uramil diacetic acid sodium. As a rust inhibitor, for example, usable are acid sulfite, sodium thiosulfate, ammonium thiodiglycolate, diisopropyl ammonium nitrite, pentaerythritol tetranitrate and dicyclohexyl ammonium nitrite.

Other than the above-described additives, a water-soluble ultraviolet absorber, a water-soluble infrared ray absorber, a solubilizer and an antioxidant may be added as required.

The ink of the second invention shows the following characteristics when 2 μl of the ink is dropped on a piece of ordinary paper having smoothness of 100 sec or lower:

a) an initial contact angle is in the range of 30 to 80°) preferably 60 to 80°, b) a dynamic contact angle X is in the range of $-10 \leq X \leq 0$ (°), preferably $-10 \leq X \leq -1$ (°); and c) the rate of change of a dot area $Y = r_t^2/r_o^2$ is in the range of $1 \leq Y \leq 1.5$.

For the measurement, 2 μl of an ink droplet is dropped on a piece of ordinary paper using a DAT apparatus manufactured by Fibro at 25° C. and 60%. The dynamic contact angle X is determined by the formula of $X = \theta_o - \theta$ wherein $\theta_o$ is an initial contact angle measured immediately after the ink droplet contacts the recording material and θ is a contact angle measured 1 second after the contact of the ink droplet.

The rate of change of a dot area Y is determined by the formula of $Y = r_t^2/r_o^2$ wherein $r_o$ is an initial dot radius and $r_t$ is a dot radius after t second.

The ink of the second invention preferably contains, as the organic solvent, polyalcohol and/or polyalcohol ether to prevent the ink from drying at a head tip and improve discharge performance.

More specifically, usable are ethylene glycol diethyl ether, triethylene glycol monobutyl ether, glycerin and 1-methyl-2-pyrrolidone. The content thereof is preferably less than 30%, e.g., 15%, of the total weight of the ink to make the ink less prone to spread.

The surfactant is preferably a nonionic surfactant in view of improving the permeability of the ink. An acetylene base surfactant such as SURFYNOL (registered trademark) and Emulmin® 110 are used to improve the discharge performance.

The coloring agent usable for the ink of the second invention may be any one of dyes and pigments. The content thereof is 0.5 to 20% of the total weight of the ink, which achieves sufficient image density and fixes the images favorably.

Examples of the water-soluble dyes include acid dyes, food dyes, direct dyes, basic dyes and reactive dyes. The pigments may be organic or inorganic pigments. These may be used solely or in combination as required. More specific examples thereof are shown below.

Examples of the acid dyes and food dyes include: C.I. acid yellow 17, 23, 42, 44, 79 and 142; C.I. acid red 1, 8, 13, 14, 18, 26, 27, 35, 37, 42, 52, 82, 87, 89, 92, 97, 106, 111, 114, 115, 134, 186, 249, 254 and 289; C.I. acid blue 9, 29, 45, 92 and 249; C.I. food yellow 3 and 4; and C.I. food red 7, 9 and 14. Examples of the direct dyes include: C.I. direct yellow 11, 12, 24, 26, 33, 44, 50, 86, 120, 132, 142 and 144; C.I. direct red 1, 4, 9, 13, 17, 20, 28, 31, 39, 80, 81, 83, 89, 225 and 227; C.I. direct orange 26, 29, 62 and 102; and C.I. direct blue 1, 2, 6, 15, 22, 25, 71, 76, 79, 86, 87, 90, 98, 163, 165, 199 and 202. Examples of the basic dyes include: C.I. basic yellow 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91; C.I. basic red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112; and C.I. basic blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155. Examples of the reactive dyes include: C.I. reactive yellow 1, 5, 11, 13, 14, 20, 21, 22, 25, 40, 47, 51, 55, 65 and 67; C.I. reactive red 1, 14, 17, 25, 26, 32, 37, 44, 46, 55, 60, 66, 74, 79, 96 and 97; and C.I. reactive blue 1, 2, 7, 14, 15, 23, 32, 35, 38, 41, 63, 80 and 95.

Examples of the organic pigments include azo pigments, phthalocyanine pigments, anthraquinone pigments, quinacrine pigments, dioxazine pigments, indigo pigments, thioindigo pigments, perylene pigments, isoindolinone pigments, aniline black, azomethine pigments, rhodamine B lake pigments and carbon black. Examples of the inorganic pigments include iron oxide, titanium oxide, calcium carbonate, barium sulfate, aluminum hydroxide, barium yellow, Berlin blue, cadmium red, chrome yellow and metallic powder.

In view of improving stability of the pigment, the organic pigment, for example, is preferably converted to a self-dispersion pigment by surface reforming treatment such as acid-basic treatment, coupling treatment, polymer graft treatment, plasma treatment and oxidation/reduction treatment. Specifically, phthalocyanine or carbon black of self-dispersion type is more preferably used.

The ink of the second invention is obtained by adding water, e.g., ion exchange water, to the above-described ingredients to reach a desired amount. The ink shows static surface tension of 27 to 38 dyne/m and viscosity of 1.9 to 3.1 cp.

By using the ink of the second invention, an ink droplet contacts the recording material and images are formed without the spreading of the ink in the lateral direction caused by too fast permeation of the ink droplet. Thus, the spreading of the ink can be decreased on ordinary paper and image density can be increased.

However, the ink of the second invention may contain, in addition to the above-described ingredients, a binder resin, a water-soluble organic solvent and various additives known in the art.

As the binder resin, a water-soluble resin such as a polyester resin is used. This allows improvement in fixing property, water resistance, as well as discharge property.

Examples of the water-soluble organic solvent to prevent dying and improve stability of the ink include: polyalcohols such as ethylene glycol, diethylene glycol, triethylene glycol, polyethylene glycol, polypropylene glycol, 1,5-pentanediol, 1,6-hexanediol, 1,2,6-hexanetriol, 1,2,4-butanetriol and 1,2,3-butanetriol; nitrogen-containing heterocyclic compounds such as N-methyl-2-pyrrolidone, N-hydroxyethyl-2-pyrrolidone, 2-pyrrolidone, 1,3-dimethyl imidazolidinone and ε-caprolactam; amides such as formamide, N-methylformamide and N,N-dimethylformamide; amines such as monoethanolamine, diethanolamine, triethanolamine, monoethylamine, diethylamine and triethylamine; sulfur-containing compounds such as dimethyl sulfoxide, sulforane, thiodiethanol, ethylene urea and urea; propylene carbonate; ethylene carbonate; and γ-butyrolactone. These may be used solely or in combination.

Further, as an antiseptic fungicide, for example, sodium dehydroacetate, sodium sorbate, sodium 2-pyridinethiol-1-oxide, sodium benzoate and sodium pentachlorophenol may be used. As a pH adjuster, any substance may be used freely as long as it can adjust the pH to 7 or higher without adversely affecting the ink to be prepared. Examples thereof include amines such as diethanolamine and triethanolamine, hydroxides of alkaline metal elements such as lithium hydroxide, sodium hydroxide and pottasium hydroxide, ammonium hydroxide, quaternary ammonium hydroxide, quaternary phosphonium hydroxide and carbonates of alkaline metals such as lithium carbonate, sodium carbonate and pottasium carbonate. As a chelating reagent, for example, usable are ethylene-diamine-tetraacetic acid sodium, nitrilotriacetic acid sodium, hydroxyethyl ethylene-diamine-triacetic acid sodium, diethylene-triamine-pentaacetic acid sodium and uramil diacetic acid sodium. As a rust inhibitor, for example, usable are acid sulfite, sodium thiosulfate, ammonium thiodiglycolate, diisopropyl ammonium nitrite, pentaerythritol tetranitrate and dicyclohexyl ammonium nitrite.

Other than the above-described additives, a water-soluble ultraviolet absorber, a water-soluble infrared ray absorber, a solubilizer and an antioxidant may be added as required.

EXAMPLES

Hereinafter, the present invention is described specifically by way of Examples and Comparative Example. However, the present invention is not limited thereto.

The compositions of examples of the ink of the first invention are shown in Table 1, in which values are expressed in wt %. Each ink was obtained by adding ion exchange water to the ingredients shown in Table 1 such that the total amount of the ink becomes 100.

TABLE 1

|  | Examples | | | | | | | | | | | | | Comparative Example |
|---|---|---|---|---|---|---|---|---|---|---|---|---|---|---|
|  | 1 | 2 | 3 | 4 | 5 | 6 | 7 | 8 | 9 | 10 | 11 | 12 | 13 | 1 |
| Direct blue 199 | 3 |  | 3 | 3 | 3 | 3 | 3 | 3 | 3 | 3 | 3 | 3 |  | 3 |
| Self-dispersion type phthalocyanine pigment dispersion |  | 20 |  |  |  |  |  |  |  |  |  |  |  |  |
| Self-dispersion type carbon black dispersion |  |  |  |  |  |  |  |  |  |  |  |  | 20 |  |
| Ethylene glycol diethyl ether |  |  |  |  |  | 10 |  |  |  |  |  |  |  |  |
| Triethylene glycol monobutyl ether | 10 | 10 | 5 | 3 | 0.5 |  | 10 | 10 | 10 | 10 | 10 | 10 | 10 |  |
| Isopropyl alcohol |  |  | 1 |  |  |  |  |  |  |  |  |  |  |  |
| Glycerin | 10 | 10 | 10 | 10 | 10 | 10 | 10 |  | 10 | 10 | 10 | 2 | 10 | 5 |
| Polyester resin | 5 | 5 | 5 | 5 | 5 | 5 | 5 |  | 5 | 5 | 5 | 5 | 5 |  |
| diethyl hexyl sulfonic acid |  |  |  |  |  |  |  |  |  |  |  |  |  | 0.1 |
| SURFYNOL |  |  |  |  |  |  |  |  |  |  | 0.5 |  |  |  |
| SOFTANOL 150 (n = 15) | 0.5 | 0.5 | 0.5 | 0.5 | 0.5 | 0.5 | 0.001 | 0.1 |  |  |  | 0.5 | 0.5 |  |
| SOFTANOL 30 (n = 3) |  |  |  |  |  |  |  |  | 0.5 |  |  |  |  |  |
| SOFTANOL 400 (n = 400) |  |  |  |  |  |  |  |  |  | 0.5 |  |  |  |  |

The ingredients of each example shown in Table 1 were mixed and stirred at 25° C. for 1 hour. Then, the resulting substance was subjected to pressure filtration using a 1.2 μm membrane filter, followed by deairation to prepare the ink.

The thus obtained ink was subjected to measurement tests using ordinary paper NM4A2S manufactured by SHARP. The results are shown in Table 2.

smudge on the filter paper was not observed. The period was rated as follows.

A: 10 seconds or shorter
B: 11 to 30 seconds
C: 31 seconds or longer

TABLE 2

|  | Examples | | | | | | | | | | | | | Comparative Example |
|---|---|---|---|---|---|---|---|---|---|---|---|---|---|---|
|  | 1 | 2 | 3 | 4 | 5 | 6 | 7 | 8 | 9 | 10 | 11 | 12 | 13 | 1 |
| Initial contact angle(°) | 60 | 73 | 59 | 62 | 65 | 72 | 74 | 70 | 62 | 61 | 58 | 72 | 73 | 73 |
| Dynamic contact angle(°/S) | −40 | −42 | −39 | −29 | −28 | −41 | −27 | −33 | −41 | −40 | −42 | −26 | −42 | −10 |
| The rate of change of dot area | 2 | 1.8 | 2.3 | 1.7 | 1.6 | 1.9 | 1.6 | 2.2 | 1.7 | 1.8 | 2 | 1.7 | 1.8 | 0.5 |
| Static surface tension (dyne/m) | 31 | 30 | 28 | 32 | 35 | 32 | 38 | 35 | 30 | 29 | 28 | 35 | 30 | 42 |
| Viscosity (cp) | 2.8 | 2.7 | 2.7 | 2.7 | 2.1 | 2.6 | 2.3 | 2.2 | 2.7 | 2.9 | 2.6 | 1.6 | 2.7 | 2.1 |

Using an inkjet printer (CL-700 manufactured by EPSON), alphabet letters or images were printed in the ink of Examples and Comparative Example on the above-described ordinary paper. The ink was evaluated on the items such as (a) Bleeding, (b) Smearing of image, (c) Drying property, (d) Image density, (OD) Evaluation, (e) Stability upon continuous discharge, (f) Fixing property and (g) Water resistance.

(a) Bleeding

An yellow solid fill was printed using genuine ink of the CL-700 printer at 25° C. and 25% RH, on which alphabet letters were printed in the ink of Examples and Comparative Example. After 1 minute, bleeding at the boundary between the yellow solid fill and the printed ink was rated against the following grades through a visual check.

A: The ink hardly spattered or bled and edges of the dots and the boundary between two colors were very sharp.
B: The ink slightly spattered or bled but edges of the dots and the boundary between two colors were sharp.
C: The spattering and bleeding were observed in almost all dots and edges of the dots and the boundary between two colors were slightly blurred.
D: The spattering and bleeding were observed in all dots and the edges of the dots and the boundary between two colors were not clear.

(b) Smearing of Image

Images were printed at 25° C. and 25% RH and the smearing of the image after 1 minute was evaluated as follows.

A: The smearing and feathering were hardly observed and the image quality was high.
B: The smearing and feathering were slightly observed but the image quality was fine on the whole.
C: The smearing and feathering were obtrusive and the image quality was poor.
D: The smearing and feathering were very obtrusive and the image quality was very poor.

(c) Drying Property

Images were printed at 25° C. and 25% RH, which were rubbed with a filter paper to obtain time passed until the (d) Image Density Measurement of OD values of solid fills was performed using an optical density measuring device (manufactured by x-rite), with which the evaluation was made as follows.

A: Image density of 1.0 or higher
B: Image density of 0.6 to 1.0
C: Image density of 0.6 or lower (e) Stability Upon Continuous Discharge Printing tests were performed to rate the discharging property as follows.

A: The ink was discharged continuously from all nozzles.
B: The ink spattered and caused clogging in some nozzles, thereby streaks were formed.
C: The ink was discharged at the beginning but the discharge stopped gradually.

(f) Fixing Property

Printed matters were rubbed with fingers to rate the fixing property as follows.

A: The ink did not transfer even immediately after the printing.
B: The ink transferred immediately after the printing but fixed as time has passed.
C: The fingers were smudged by rubbing.
D: The image was spoiled by rubbing.

(g) Water Resistance

Printed matters were soaked into water to measure changes in ID of the printed portions using an optical density measuring device (manufactured by x-rite). Water resistance was rated as follows.

A: Change in ID≦0.01
B: 0.01<change in ID<0.2
C: Change in ID≧0.2

The results of the above-described tests and general evaluations are shown in Table 3.

TABLE 3

|  | Examples | | | | | | | | | | | | | Comparative Example |
|---|---|---|---|---|---|---|---|---|---|---|---|---|---|---|
|  | 1 | 2 | 3 | 4 | 5 | 6 | 7 | 8 | 9 | 10 | 11 | 12 | 13 | 1 |
| Bleeding | A | A | A | A | A | A | A | A | A | A | A | A | B | D |
| Smearing | A | A | A | A | A | A | A | A | A | A | A | A | B | D |
| Drying property | A | A | A | B | B | A | C | C | A | A | A | A | A | D |
| Image density (OD) | A | A | B | B | B | B | B | B | A | A | B | B | A | A |
| Stability during continuous discharge | A | A | A | B | C | B | B | B | B | B | A | B | A | C |
| Fixing property | A | A | A | A | A | A | A | A | A | A | A | A | A | D |
| Water resistance | C | A | C | C | C | C | C | C | C | C | C | C | A | C |
| General evaluations | ○ | ◎ | ○ | ○ | ○ | ○ | ○ | ○ | ○ | ○ | ○ | ○ | ◎ | X |

The compositions of examples of the ink of the second invention are shown in Table 4, in which values are expressed in wt %. Each ink was obtained by adding ion exchange water to the ingredients shown in Table 4 such that the total amount of the ink becomes 100.

TABLE 4

|  | Examples | | | | | Comparative Examples | | |
|---|---|---|---|---|---|---|---|---|
|  | 14 | 15 | 16 | 17 | 18 | 2 | 3 | 4 |
| Self-dispersion type carbon black dispersion | 20 |  | 20 | 20 |  |  | 20 | 20 |
| Self-dispersion type phthalocyanine pigment dispersion |  |  |  |  | 20 |  |  |  |
| Dye |  | 3 |  |  |  | 3 |  |  |
| Ethylene glycol diethyl ether |  | 5 |  |  |  |  |  | 10 |
| Triethylene glycol monobutyl ether | 5 |  | 5 | 5 | 5 | 10 | 20 | 15 |
| Glycerin | 10 | 10 | 10 | 10 | 10 | 20 | 20 | 10 |
| 1-methyl-2-pyrrolidone |  |  |  |  |  | 10 |  | 10 |
| Polyester resin | 5 | 5 | 5 |  | 5 | 5 |  |  |
| SURFYNOL 465 | 0.2 |  | 0.5 |  |  |  |  |  |
| Emulmin 110 |  | 0.2 |  | 0.5 | 0.5 | 1 | 0.2 | 0.5 |

The ingredients of each example shown in Table 4 were mixed and stirred at 25° C. for 1 hour. Then, the resulting substance was subjected to pressure filtration using a 1.2 μm membrane filter, followed by deairation to prepare the ink.

The thus obtained ink was subjected to measurement tests using ordinary paper NM4A2S manufactured by SHARP. The results are shown in Table 5.

TABLE 5

|  | Examples | | | | | Comparative Examples | | |
|---|---|---|---|---|---|---|---|---|
|  | 14 | 15 | 16 | 17 | 18 | 2 | 3 | 4 |
| Initial contact angle (°) | 78 | 68 | 72 | 78 | 73 | 65 | 72 | 67 |
| Dynamic contact angle (°) | −2 | −1 | −2 | −1 | −2 | −30 | −28 | −33 |
| The rate of change of dot area | 1.1 | 1 | 1.2 | 1.1 | 1.3 | 2.5 | 2 | 1.8 |

TABLE 5-continued

|  | Examples | | | | | Comparative Examples | | |
|---|---|---|---|---|---|---|---|---|
|  | 14 | 15 | 16 | 17 | 18 | 2 | 3 | 4 |
| Static surface tension (dyne/m) | 35 | 38 | 27 | 32 | 28 | 31 | 28.5 | 27.8 |
| Viscosity (cp) | 2.5 | 1.9 | 2.9 | 2.2 | 3.1 | 3.7 | 3.5 | 3.2 |

Using an inkjet printer (CL-700 manufactured by EPSON), alphabet letters or images were printed in the prepared ink of Examples and Comparative Example on the above-described ordinary paper to make evaluations on the items such as (a) Image density, (b) Smearing of image and (c) Stability upon discharge.

(a) Image Density

Measurement of OD values of solid fills was performed using an optical density measuring device (manufactured by x-rite), with which the evaluation was made as follows.

A: Image density of 1.0 or higher
B: Image density of 0.8 to 1.0
C: Image density of 0.8 or lower (b) Smearing of Image Alphabet letters and Images for evaluation were printed in seven colors ink of RBGCMYK at 25° C. and 25% RH and the smearing of the image after 1 minute was evaluated as follows.

A: The smearing and feathering were hardly observed and the image quality was high.
B: The smearing and feathering were slightly observed but the image quality was fine on the whole.
C: The smearing and feathering were obtrusive and the image quality was poor.
D: The smearing and feathering were very obtrusive and the image quality was very poor.

(c) Stability Upon Discharge

10% filled-in images were printed on A4-size paper and the discharge property was evaluated as follows.

A: The images were printed without white streaks.
B: White streaks were formed but the images were printed
C: A number of white streaks were formed.

The results of the above-described tests and general evaluations are shown in Table 6.

TABLE 6

|  | Examples | | | | | Comparative Examples | | |
| --- | --- | --- | --- | --- | --- | --- | --- | --- |
|  | 14 | 15 | 16 | 17 | 18 | 2 | 3 | 4 |
| Image density (OD) | A | A | B | A | A | C | C | C |
| Smearing | A | A | B | B | A | D | D | D |
| Stability during discharge | A | A | A | A | A | C | C | B |
| General evaluation | ⊚ | ⊚ | ○ | ○ | ⊚ | X | X | Δ |

According to the present invention, there is provided as the first invention, ink for inkjet recording containing ethylene glycol base ether and/or monovalent alkyl alcohol, a surfactant and a coloring agent, the ink showing the following characteristics when 2 µl of the ink is dropped on a piece of ordinary paper having smoothness of 100 sec or lower:

a) an initial contact angle is in the range of 30 to 80°;

b) a dynamic contact angle after 1 second $X=\theta-\theta_o$ ($\theta$ is a dynamic contact angle after 1 second) according to dynamic absorption measurement is in the range of $-70 \leq X \leq -20$ (°/s); and c) the rate of change of a dot area after t second (0.1<t<5 (s)) $Y=r_t^2/r_o^2$ ($r_t$ is a dot radius after t second) is in the range of 1.5<Y.

The ink preferably shows the characteristics that a) the initial contact angle is in the range of 50 to 80°, b) the dynamic contact angle X is in the range of $-50 \leq X \leq -20$ (°/s) and c) the rate of change of the dot area is in the range of 1.5 to 3.0. It is also preferred that the content of ethylene glycol base ether is 0.5% or more or the content of monovalent alkyl alcohol is 1% or more as a solvent. Thereby, the permeability of the ink is improved.

Further, the ink contains a nonionic surfactant in the proportion of 0.001 to 0.5% as the surfactant. This allows increase in stability of the ink and printing of high quality images.

Still further, the ink of the first invention optionally contains a binder resin such as a polyester resin. This allows improvement in fixing property, water resistance, as well as discharge property.

According to the second invention, there is provided ink for inkjet recording containing at least an organic solvent, a surfactant and a coloring agent, the ink showing the following characteristics when 2 µl of the ink is dropped on a piece of ordinary paper having smoothness of 100 sec or lower:

a) an initial contact angle is in the range of 30 to 80°;

b) a dynamic contact angle after 1 second $X=\theta-\theta_o$ ($\theta$ is a dynamic contact angle after 1 second) according to dynamic absorption measurement is in the range of $-10 \leq X \leq 0$ (°); and c) the rate of change of a dot area after t second (0<t<10 (s)) $r_t^2/r_o^2$ ($r_t$ is a dot radius after t second) is in the range of $1 \leq r_t^2/r_o^2 \leq 1.5$.

The ink preferably shows the characteristics that a) the initial contact angle is in the range of 60 to 80° and b) the dynamic contact angle X is in the range of $-10 \leq X \leq -1$ (°). It is also preferred that the ink contains, as a solvent, at least one polyalcohol and/or polyalcohol ether in the proportion of less than 30% of the total weight of the ink. Thereby, the drying of the ink and smearing of images are prevented and the discharge performance of the ink is improved.

Further, the ink contains a surfactant This allows improvement in permeability and the discharge performance.

Still further, the ink of the second invention optionally contains a binder resin such as a polyester resin. This allows improvement in fixing property, water resistance, as well as discharge property.

What is claimed is:

1. Ink for inkjet recording containing ethylene glycol base ether and/or monovalent alkyl alcohol, a surfactant and a coloring agent, the ink showing the following characteristics when 2 µl of the ink is dropped on a piece of ordinary paper having smoothness of 100 sec or lower:

a) an initial contact angle is in the range of 30 to 80°;

b) a dynamic contact angle after 1 second $X=\theta-\theta_o$) ($\theta$ is the dynamic contact angle after 1 second) according to dynamic absorption measurement is in the range of $-70 \leq X \leq -20$(°/s); and c) the rate of change of a dot area after t second (0.1<t<5 (s)) $Y=r_t^2/r_o^2$ ($r_t$ is a dot radius after t second) is in the range of 1.5 <Y.

2. Ink according to claim 1, wherein a) the initial contact angle is in the range of 50 to 80° b) the dynamic contact angle X is in the range of $-50 \leq X \leq -20$(°/s) and c) the rate of change of the dot area Y is in the range of 1.5 to 3.0.

3. Ink according to claim 1, wherein the content of ethylene glycol base ether is 0.5 weight % or more or the content of monovalent alkyl alcohol is 1 weight % or more.

4. Ink according to claim 1, wherein the surfactant is a nonionic surfactant.

5. Ink according to claim 1, wherein the content of the surfactant is 0.001 to 0.5 weight %.

6. Ink according to claim 1, wherein a binder resin is further contained.

* * * * *